(12) United States Patent
Cao

(10) Patent No.: US 6,876,639 B1
(45) Date of Patent: Apr. 5, 2005

(54) TRANSMISSION CONTROL PROTOCOL HANDOFF NOTIFICATION SYSTEM AND METHOD

(75) Inventor: Carl F. Cao, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 835 days.

(21) Appl. No.: 09/584,539

(22) Filed: Jun. 1, 2000

(51) Int. Cl.[7] .............................................. H04Q 7/00
(52) U.S. Cl. ..................................... 370/331; 370/428
(58) Field of Search ................................ 370/331, 349, 370/332, 353, 356, 310, 338, 230, 237, 229, 428, 401, 469, 395.52; 455/445, 437, 436, 438; 714/704; 709/226

(56) References Cited

U.S. PATENT DOCUMENTS

| | | | | |
|---|---|---|---|---|
| 5,530,693 A | * | 6/1996 | Averbuch et al. | 370/331 |
| 5,937,169 A | * | 8/1999 | Connery et al. | 709/250 |
| 6,208,620 B1 | * | 3/2001 | Sen et al. | 370/231 |
| 6,215,769 B1 | * | 4/2001 | Ghani et al. | 370/230 |
| 6,272,148 B1 | * | 8/2001 | Takagi et al. | 370/469 |
| 6,510,144 B1 | * | 1/2003 | Dommety et al. | 370/328 |
| 6,591,382 B1 | * | 7/2003 | Molloy et al. | 714/704 |
| 6,594,258 B1 | * | 7/2003 | Larson et al. | 370/353 |
| 6,628,632 B1 | * | 9/2003 | Dolan | 370/332 |
| 6,640,248 B1 | * | 10/2003 | Jorgensen | 709/226 |

OTHER PUBLICATIONS

Gupta et al. , Impacts of Handoff on TCP Performance in Mobile Wireless Computing, 1997 IEEE, pp. 184–188.*

* cited by examiner

Primary Examiner—Chi Pham
Assistant Examiner—Alexander O. Boakye (57) ABSTRACT

The present invention provides a transfer control protocol handoff notification (TCPHN) mechanism for a wireless network by which hosts connected through the wireless network via a transfer control protocol (TCP) connection can be notified in the event a handoff occurs. The TCPHN mechanism allows hosts connected in TCP to avoid TCP timeouts and reduce any adverse effect on transmission performance. The TCPHN mechanism of the present invention can be used in relation to any TCP connection between any transmitting and receiving host where at least one of the transmitting and receiving hosts is mobile and subject to handoffs. In one embodiment for example, the TCPHN mechanism is used in relation to a TCP connection between a mobile host in a wireless network and a non-mobile server host in a connecting Internet protocol (IP) network.

23 Claims, 9 Drawing Sheets

TRANSMISSION CONTROL PROTOCOL HANDOFF NOTIFICATION SYSTEM AND METHOD

FIELD OF THE INVENTION

The present invention relates generally to transmission control protocol (TCP) communications and more particularly to handoff notification in TCP communication systems.

BACKGROUND OF THE INVENTION

In today's communications industry, many networks are designed to support transmission control protocol (TCP) communications. As is well known, TCP is a transport layer protocol that uses acknowledgements to provide reliable end-to-end byte stream transport between hosts in a network.

Figure 1:
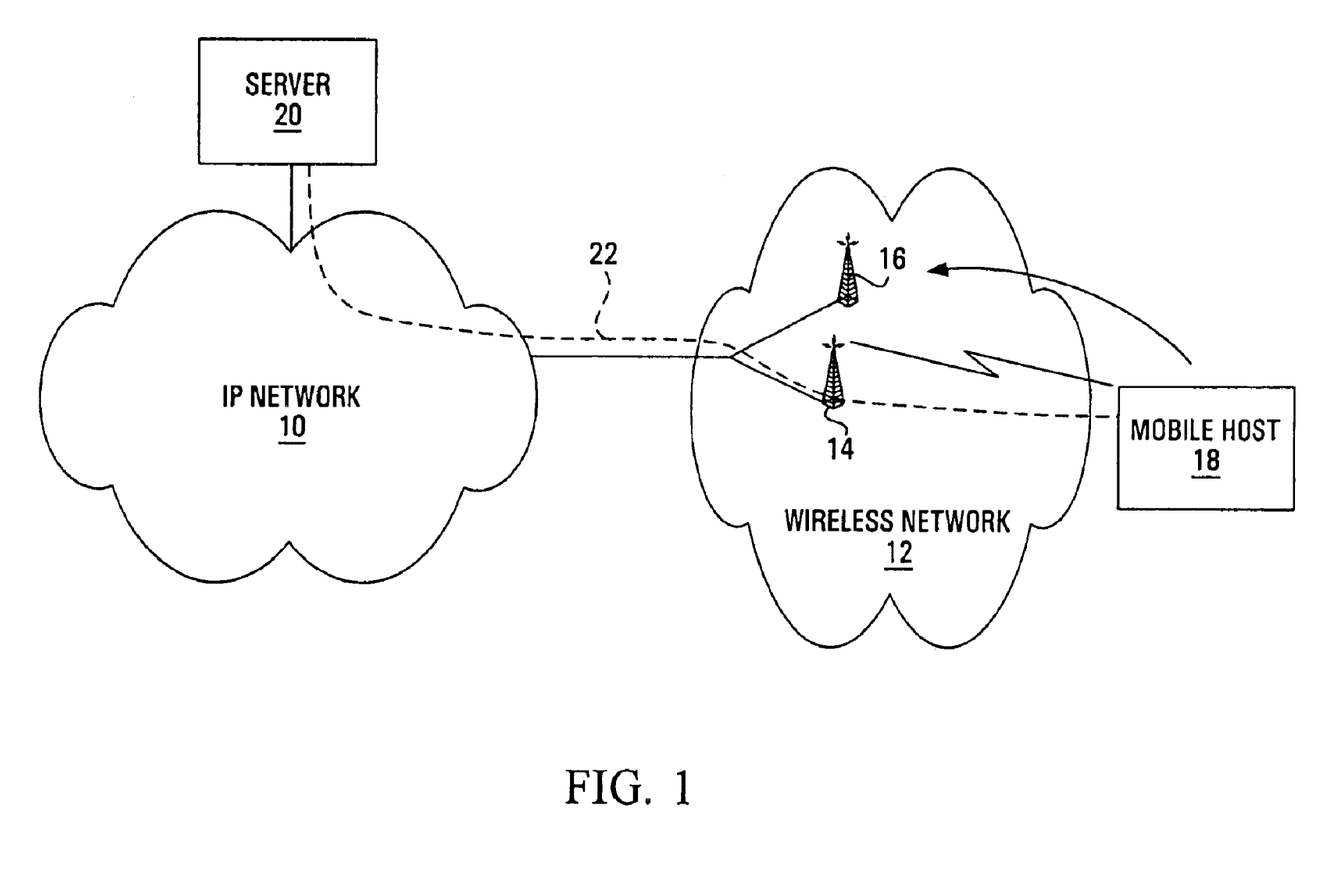
FIG. 1 is a diagram showing a server in an Internet protocol (IP) network connected to a mobile host in a connecting wireless network.

In conventional network configurations, it is common to use TCP mechanisms to reliably transport data between mobile and non-mobile hosts of the same or connecting networks. FIG. 1 illustrates an example where such a TCP transport connection is used between a host of an Internet protocol (IP) network 10 and a mobile host of a wireless network 12. In this particular example, a mobile host 18 in the wireless network 12 communicates with a remote server 20 of the IP network 10 by means of a TCP connection 22.

The wireless network 12 is formed of a plurality of radio nodes 14, 16 (only two shown) which can each provide access to the IP network 10. As is conventional, the mobile host 18 can access the IP network 10 through any of these radio nodes 14, 16. For the purpose of example, the TCP connection 22 between the mobile host 18 and the remote server 20 of the IP network 10 is shown established through the radio node 14.

At the radio node 14, radio channel resources are allocated to the mobile host 18 so that it can establish and maintain thereafter its TCP connection 22 with the server 20. When the mobile host 18 moves out of coverage of the radio node 14 and in proximity of another node, such as for example the radio node 16, the mobile host 18 is handed off to that other node 16. During handoff, the radio resources allocated by the first radio node 14 are released and typically re-allocated to other mobile hosts. As the mobile host 18 is handed off, the second radio node 16 proceeds to allocate sufficient radio resources for the mobile host 18 to maintain connectivity with the server 20.

During handoff, there is usually a time period during which the mobile host 18 does not have any radio channel resources allocated to it. Between the time the radio channel resources from the first node 14 are released and new radio resources from the second node 16 are allocated, the mobile host 18 may not be able to exchange data with the server 20. In particular and more importantly, during that time, the mobile host 18 may not be able to acknowledge packets successfully received from the server 20.

In TCP, for a transmitting host such as the server 20 to maintain good transmission performance, it is important for a receiving host such as the mobile host 18 to acknowledge packets within a predetermined timeout period. If the server 20 consistently receives acknowledgements within the timeout period, TCP will gradually increase the transmission rate of the server 20 until the most efficient rate at which TCP can operate is achieved. If on the other hand, an acknowledgement is not received within the timeout period, TCP will timeout and cause the server 20 to reduce its transmission rate considerably to inhibit further timeouts.

Between the server 20 and the mobile host 18, timeouts are likely during hand-off. As noted above, each time the mobile host 18 is subject to a handoff, the mobile host 18 will be temporarily without any radio channel resources allocated and therefore unable to send or receive acknowledgements. During these temporary handoff disruptions, the acknowledgements sent between the server 20 and the mobile host 18 will not reach the destination on time. As a result, TCP will inevitably time out and cause the transmitting host (the server 20 or the mobile host 18) to drop its transmission rate significantly.

In TCP, the transmission rate of a transmitting host is controlled by what is commonly referred to as the congestion window. As is well known, the congestion window identifies the allowable number of packets that can be transmitted by a transmitting host prior to receiving any acknowledgement.

Figure 2:
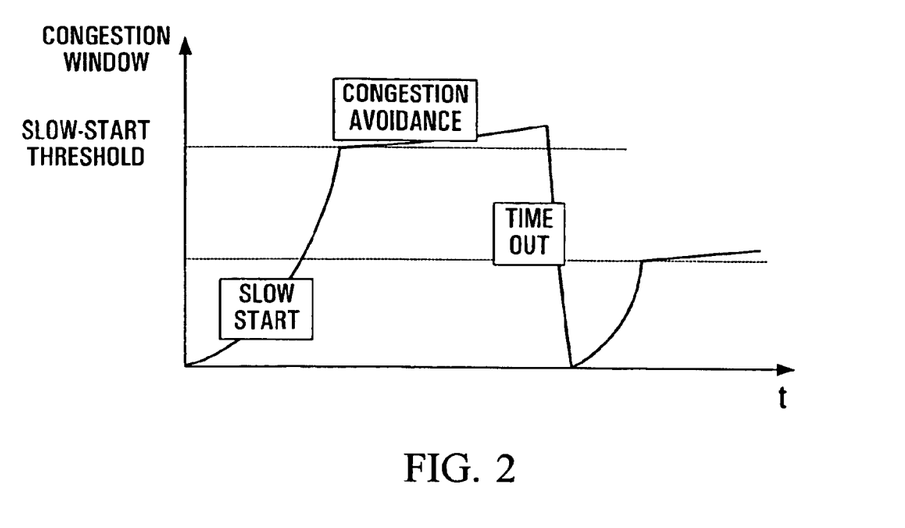
FIG. 2 is a time plot of the congestion window for the server with respect to transfer control protocol (TCP) data sent to the mobile host.

For any transmission from a transmitting host to a receiving host, the congestion window of the transmitting host is set based on the acknowledgements received from the receiving host. The congestion window grows if a steady stream of acknowledgements are received, but will be negatively impacted by acknowledgements not received before the expiration of a timeout period. To further illustrate this, FIG. 2 shows a time plot of a TCP congestion window for the server 20 for packets sent from the server 20 (transmitting host) to the mobile host 18 (receiving host).

When the server 20 begins transmitting packets to the mobile host 18, TCP enters a "slow-start" state during which it explores the server's transmission environment to set an appropriate transmission rate. As TCP enters that particular state, the congestion window for the server 20 is set very small, typically one or more MTUs (maximum transmission unit) or packets.

If every packet is acknowledged within the timeout period and TCP does not timeout, the congestion window of the server 20 is increased exponentially with each acknowledgement received. This causes the transmission rate of the server 20 to increase accordingly. When the congestion window reaches a pre-defined slow-start threshold, TCP transitions into a "congestion avoidance" state during which the exponential congestion window growth is reduced to a slow linear growth and stabilized at a particular level which represents the most efficient transmission rate at which TCP can transmit packets without timing out.

If the server 20 fails to receive an acknowledgement for a transmitted packet within the timeout period, TCP will time out. As is well known, timeouts in TCP have a considerable impact on the server's transmission performance. When a timeout occurs, TCP will collapse the congestion window and re-enter the slow-start state, thereby effectively resetting the transmission rate of the server 20 back to its initial value (e.g. MTU). In addition to collapsing the congestion window and re-entering the slow-start state, TCP will also reduce the slow-start threshold by half. Because of this, the duration of the slow-start state will be shorter and the congestion window growth will be considerably reduced.

Another adverse effect of TCP timeouts is that unacknowledged packets are retransmitted. If, for example, packets are transmitted by the server 20 and not received or acknowledged by the mobile host 18 because of a handoff, the packets will be retransmitted. These packets are said to be redundant and typically discarded either because they cannot be delivered to the mobile host 18 or because they have already been transmitted successfully to the mobile host 18. Unfortunately however, transmitting redundant packets increases congestion in the IP network 10 and the wireless network 12 and inevitably reduces transmission performance.

Therefore, because of their adverse impact on transmission performance, timeouts in TCP are highly undesirable. In systems where hosts can maintain connectivity with little or no disruption, the impact on transmission performance may be acceptable. However, systems such as shown in FIG. 1 where TCP communications between the server 20 and the mobile host 18 are subject to handoff disruptions, TCP timeouts will occur and have an adverse effect on transmission performance.

TCP Explicit Congestion Notification (TCP/ECN) as proposed in IETF RFC2481 is a mechanism that uses special bits in IP and TCP headers to inform the end-hosts (both the sender and the receiver) of immanent congestion in the network. It causes intermediate ECN capable routers in an end-to-end connection to set congestion experienced (CE) bit in IP packets in the sender-to-receiver direction, and on receiving such packets, the receiving host to send congestion notification to the sending host via the ECN Echo bit in the TCP acknowledgement. The response of the sending TCP in ECN does not solve the above-discussed problems. It will half its TCP congestion window and reduce the slow-start threshold in order to reduce the amount of data transmitted into the network. Additionally, an ECN Echo will only be sent at the receiving host.

Other methods have been proposed that improve TCP performance over wireless and mobile networks using ECN such as [Peng and Ma, 2000]. Wireless links substantially increase the round trip time of the connection. When congestion is experienced in an intermediate router the ECN CE packet will have to travel all the way to the receiving (wireless) host, which then sends ECN Echo messages to the sending host. [Peng and Ma, 2000] modifies ECN by allowing the intermediate routers to send congestion notification immediately, cutting short of the delay to and from the receiving host. This enables faster congestion response, but it still halves the congestion window and resets the slow-start threshold.

Explicit Loss Notification (TCP/ELN) [H. Balakrishnan and R. H. Katz, 1998] is another proposal which involves sending a notification back to the sending host. This notification indicates that the loss of a packet is not due to network congestion, but possibly because of (wireless) data corruption. This notification causes the sending host to retransmit the designated packet and carry on the normal operations of TCP. This response by the sending host is effective in not disrupting TCP operations when packet loss is not caused by network congestion, but is not suitable for wireless handoffs as packet transmission cannot be sustained due to the loss of the transmission link.

The Suspend/Resume mechanisms provided by GSM/GPRS that operate at the network or link layers also do not address the problems at hand. These mechanisms instruct data transfer to be suspended or resumed based on link conditions between the Mobile Switching Center (MSC) and the Mobile Station (MS) via the Base Station (BS). However, these methods will have no impact on TCP. They may hold up data to be transferred to and within the network. The TCP host, however, will be transparent to these, and will continue its normal operations without stopping (re)-transmitting data.

In order to avoid TCP timeouts and reduce any adverse effect on transmission performance, it would be desirable that TCP hosts such as the mobile host 18 and the server 20 respond more robustly to periods of transmission loss occurring during mobile handoff.

SUMMARY OF THE INVENTION

The present invention provides a transmission control protocol handoff notification (TCPHN) mechanism for a wireless network by which hosts connected through the wireless network via a transmission control protocol (TCP) connection can be notified in the event of a handoff. According to the invention, the TCPHN mechanism allows hosts connected in TCP to avoid TCP timeouts and reduce any adverse effect on transmission performance.

The TCPHN mechanism of the present invention can be used in relation to any TCP connection between any transmitting and receiving host where at least one of the transmitting and receiving hosts is wireless and subject to handoffs. In one embodiment for example, the TCPHN mechanism is used in relation to a server-to-mobile TCP connection between a server in an Internet Protocol (IP) network and a mobile host in a connecting wireless access network.

In this particular embodiment, a TCPHN algorithm is implemented in the wireless network to notify the server when the mobile host is in handoff. In a pre-handoff stage, the TCPHN algorithm receives notification from the wireless network that the mobile host is entering handoff. Upon being notified of a handoff, the TCPHN algorithm enters a handoff stage to notify the server of the handoff.

According to the invention, different methods can be used to notify the server of a handoff. For example, the TCPHN algorithm could be designed to intercept an acknowledgement packet sent by the mobile host to the server and set a flag or an option within that packet to denote the handoff.

Alternatively, the TCPHN algorithm could also be designed to send an ICMP message (Internet control message protocol) to notify the server of the handoff.

At the server, the TCP protocol stack is designed to recognize and act upon handoff notifications received from the TCPHN algorithm. When a handoff notification is received, the TCP protocol stack operates to freeze the server's congestion window and force the server to suspend its transmissions to the mobile host.

When the wireless network informs the TCPHN algorithm that the handoff is over, the TCPHN algorithm enters a post-handoff stage to notify the server. According to the invention, this can also be done in different ways, including for example setting a flag or an option in an intercepted acknowledgement packet or sending an ICMP message to the server. When a notification is received, the TCP protocol stack will cause the server to resume transmitting from the last acknowledged byte using the pre-handoff transmission context. This context may indicate the frozen congestion window size, the slow start threshold and the last byte that was acknowledged.

Advantageously, by notifying the server before and after each handoff, the TCPHN mechanism will prevent the TCP protocol stack from timing out during handoff and allow fast recovery of the TCP connection with the mobile host. In addition, the TCPHN mechanism will also advantageously reduce the number of redundant packets that would otherwise be transmitted by the server.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENTS

An embodiment of the present invention provides a transfer control protocol handoff notification (TCPHN) mechanism for a wireless network by which transmitting transmission control protocol hosts can be notified in the event of a handoff. The TCPHN mechanism of the present embodiment allows hosts connected in TCP to avoid TCP timeouts and reduce any adverse effect on transmission performance.

According to an embodiment of the invention, the TCPHN mechanism can be used in relation to any TCP connection between any transmitting and receiving host where at least one of the transmitting and receiving hosts is a wireless host. This may include for example TCP connections between mobile and non-mobile hosts of the same or connecting networks. Referring back to FIG. 1, the TCPHN mechanism could for example be used in relation to a TCP connection 22 between a server 20 and a mobile host 18.

With the TCPHN mechanism of this embodiment of the present invention, it is possible to avoid TCP timeouts during handoffs and reduce any adverse effects on the server's transmission performance that may result therefrom. For the purpose of example and clarity, the TCPHN mechanism of the present invention is hereinafter described with reference to a network arrangement of FIG. 3 which is similar to that of FIG. 1, but with modified components as described in detail below.

Further, the TCPHN mechanism will only be described in relation to TCP transmissions from the server (hereinafter also referred to as the transmitting host) to the mobile host (hereinafter also referred to as the receiving host). However, it is to be understood that the TCPHN mechanism is not restricted to a particular direction of transmission. For the particular example of FIG. 3, the TCPHN mechanism can be applied not only in the server to mobile direction but also in the mobile to server direction.

When the mobile host is the transmitter it is not necessary to notify the mobile host of a handoff since it becomes aware of it at the same time as the wireless network will. At such times the TCP protocol stack in the mobile host needs to be modified to perform the TCPHN behaviour, but the wireless network does not need to perform this behaviour.

Figure 3:
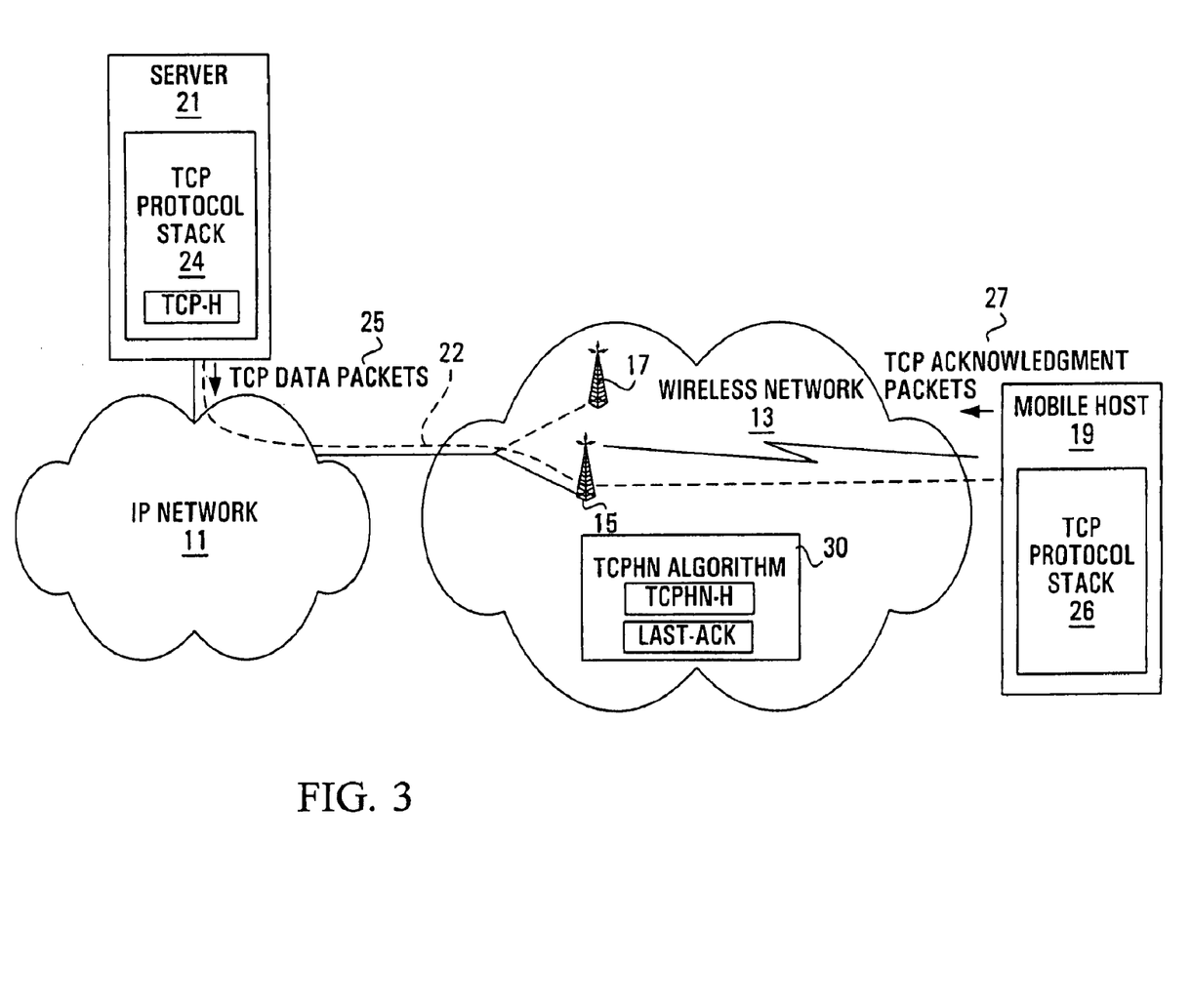
FIG. 3 is a diagram of the TCP handoff notification (TCPHN) mechanism according to the invention as applied to TCP transmissions from the server to the mobile host of FIG. 1.

FIG. 3 illustrates an example of the TCPHN mechanism as applied to TCP transmissions from a server 21 to a mobile host 19. In this particular example, the server 21 is shown transmitting TCP data packets 25 to the mobile host 19 while the mobile host 19 is shown sending TCP acknowledgement packets 27 back to the server 21, all through a wireless network 13 and IP network 11.

The server 21 and mobile host 19 each have a TCP protocol stack 24, 26 to send and receive TCP data. While the TCP protocol stack 26 in the mobile host is unchanged for traffic from the server 21 to the mobile host 19, the TCP protocol stack in the server 21 may be changed in a manner described below to make use of the hand off notifications. In addition to these TCP protocol stacks 24, 26, a TCPHN algorithm 30 is implemented in the wireless network 13 to notify the server 21 when the mobile host 19 is in handoff. The TCPHN algorithm may be instantiated on a per connection basis. The description will focus on a single instance. According to the invention, the TCPHN algorithm 30 can be implemented in an existing network element of the wireless network 13, a new network element or distributed amongst a collection of existing and/or new network elements.

In order to properly notify the server 21 when the mobile host 19 is in handoff, the TCPHN algorithm 30 maintains a number of state variables. In the example of FIG. 3, the TCPHN algorithm 30 maintains one variable TCPHN-H which is used to denote whether the mobile host 19 is involved in a handoff and a second variable LAST-ACK to keep track of the most recent TCP acknowledgement packet sent by the mobile host 19.

To maintain TCPHN-H, the TCPHN algorithm 30 relies on handoff notifications from the physical layer(s) responsible for maintaining a wireless link with the mobile host 19. As is well known, physical layers in a wireless network are directly involved during handoff and as such. The physical layer is adapted to notify appropriate TCP entities in the same network when a mobile handoff occurs.

Each time the TCPHN algorithm 30 receives a notification from the physical layer that the mobile host 19 is in handoff, the TCPHN algorithm 30 modifies the state of the TCPHN-H variable to denote the handoff. The TCPHN-H variable may, for example, be a binary state variable or any other type of state variable suited to denote the beginning and the end of a mobile handoff. For example, the TCPHN-H variable could be a binary state variable set to a non-zero value (e.g. one) when a handoff is in progress and set to zero when a handoff is not in progress. Alternatively, the TCPHN-H variable could be set to zero to denote a handoff is in progress and to a non-zero value otherwise.

In addition to maintaining the TCPHN-H variable, the TCPHN algorithm 30 also maintains the LAST-ACK variable to keep track of the most recent TCP acknowledgement packet sent. The LAST-ACK variable is continuously updated with the last TCP acknowledgement packet sent by the mobile host 19. According to the invention, the TCPHN algorithm 30 is configured to intercept each TCP acknowledgement packet sent by the mobile host 19 and store a copy of the most recent TCP acknowledgement packet sent in the LAST-ACK variable before forwarding the acknowledgement packet to the server. By keeping track of the most TCP acknowledgement packet sent, the TCPHN algorithm 30 has the ability to accurately notify the server 21 of the last byte of information acknowledged. According to the invention, the LAST-ACK variable can be implemented in software, in hardware or in any other manner or form, as is considered appropriate. Details of how the TCPHN algorithm notifies the server of a handoff are presented below with reference to FIG. 5A.

At the server 21, the TCP protocol stack 24 is adapted to recognize and act upon handoff notifications received from the TCPHN algorithm 30. According to the invention, the TCP protocol stack 24 of the server 21 maintains a variable TCP-H to keep track of handoffs identified by the TCPHN algorithm 30. More specifically, each time the server 21 receives a handoff notification from the TCPHN algorithm 30, the TCP protocol stack 24 modifies the state of the TCP-H variable to denote the handoff.

According to the invention, this can be done in different ways. One possible way is that the TCP-H variable could be set to a non-zero value for the duration of the handoff. When the server 21 is notified the mobile host 19 is no longer in handoff, the TCP-H variable could be reset to zero. Another possible way is that the TCP-H variable could be set to zero to denote a handoff and to a non-zero value otherwise. Similarly to the TCPHN-H variable, the TCP-H variable can be a binary state variable or any other type of variable suited to denote the mobile handoff state. Details of how the TCP protocol stack 24 in the server 21 use this information to control TCP are presented below with reference to FIG. 5B.

As it can be seen from the above, with the LAST-ACK and TCPHN-H variables, the TCPHN algorithm 30 can maintain knowledge of each handoff the mobile host 19 enters and what the last byte acknowledged is. Similarly, with the TCP-H variable, the TCP protocol stack 24 (and hence the server 21) can also maintain knowledge of each handoff identified by the TCPHN algorithm 30.

According to the invention, the TCPHN algorithm 30 can use different methods to notify the server 21 of mobile handoffs. For example, the TCPHN algorithm 30 could be designed to use a flag or an option in each TCP acknowledgement packet intercepted during a handoff to notify the server 21 whether the mobile host 19 is in handoff or not. In this particular example, any available bit such as, for example, a reserved bit in the TCP header or any other available field in the TCP acknowledgement packets intercepted could be used. TCP options are additional data bits carried by a TCP header. They are optional and can be placed at the tail of each header.

Alternatively, the TCPHN algorithm 30 could instead be designed to send an ICMP message or any other message when the mobile host 19 is in handoff.

According to the invention, these options can equally be used to achieve the desired result. For the purpose of example, it is hereinafter assumed that the TCPHN algorithm 30 uses a reserved bit in the TCP acknowledgement packet header to notify the server 21 of mobile handoffs.

Figure 4:
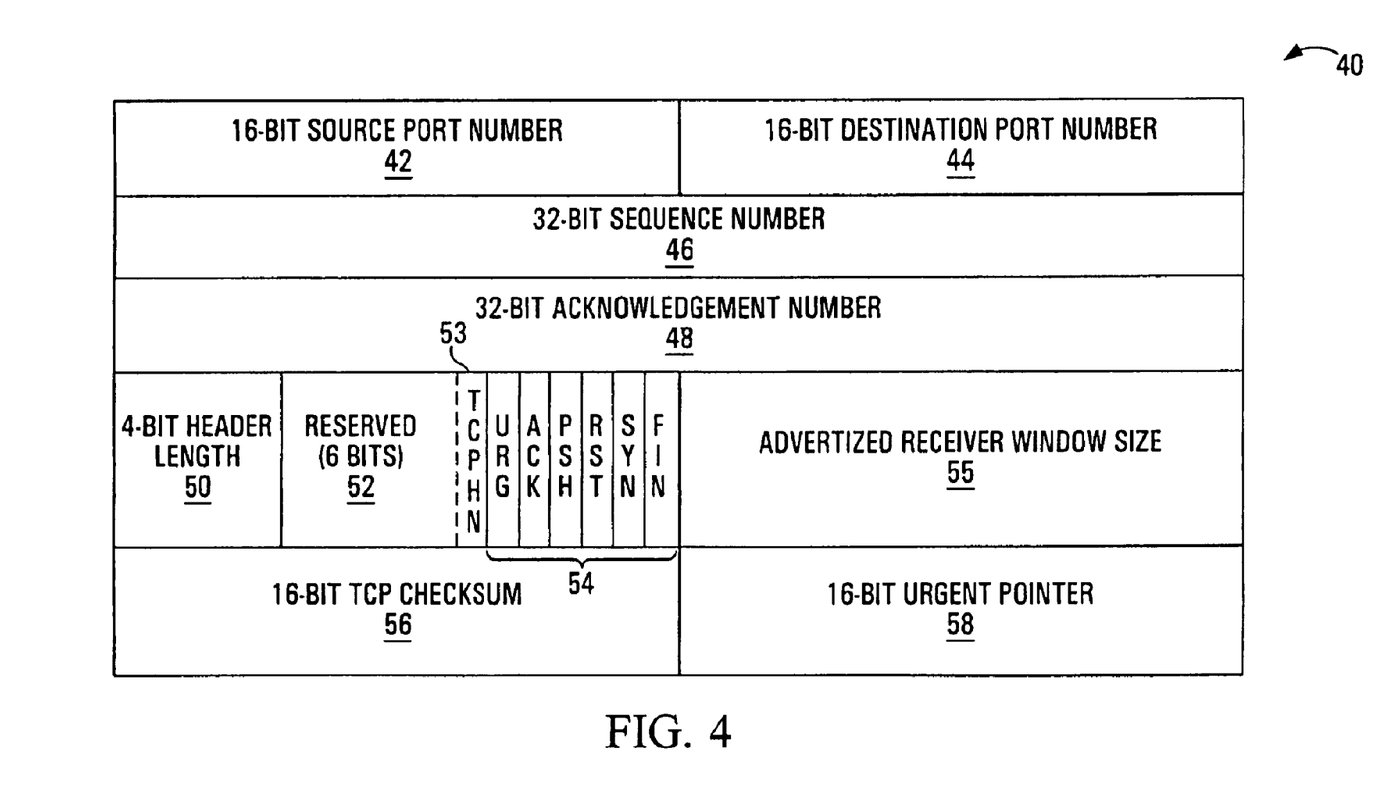
FIG. 4 is a TCP acknowledgement packet used by the TCPHN algorithm of FIG. 3 to report mobile handoffs to the server of FIG. 1.

FIG. 4 shows a TCP acknowledgement packet header generally indicated by 40 in which a reserved bit 53 is used to report mobile handoffs to the server 21.

As is conventional, the TCP acknowledgement packet 40 shown in this Figure has 16-bit source and destination port numbers 42, 44, a 32-bit sequence number 46, a 32-bit acknowledgement number 48, a 4-bit header length number 50, a field 52 for reserved bits, a flags field 54 for control bits, a 16-bit advertised window size field 55, a 16-bit TCP checksum 56 and a 16-bit urgent pointer 58.

The flags 54 include ACK indicating an acknowledgement packet, SYN indicating an initialization packet, FIN indicating a closing packet, etc., RST indicating a connection reset, PSH indicating the receiver should pass this data to the application ASAP and URG the urgent pointer is valid.

In this particular example, one of the reserved bits 52 will hereinafter be referred to as the TCPHN flag 53 and is used by the algorithm 30 to notify the server 21 when the mobile host 19 is in handoff. According to the invention, the TCPHN flag 53 can be used in different ways to denote a mobile handoff. For example, the TCPHN algorithm 30 could set the TCPHN flag 53 to a non-zero value to denote a handoff and to zero otherwise. Alternatively, the TCPHN algorithm 30 could set the TCPHN flag 53 to zero value to denote a handoff and to a non-zero value otherwise. For the purpose of example and clarity, it is hereinafter assumed that the TCPHN flag 53 is set to one to denote a handoff and to zero otherwise.

Details of the TCPHN algorithm 30 will now be described with reference to FIGS. 5A, 5B and 5C. The functionality of the TCP protocol stack at the transmitting host will be described further below with reference to FIGS. 6A and 6B.

Figure 5A:
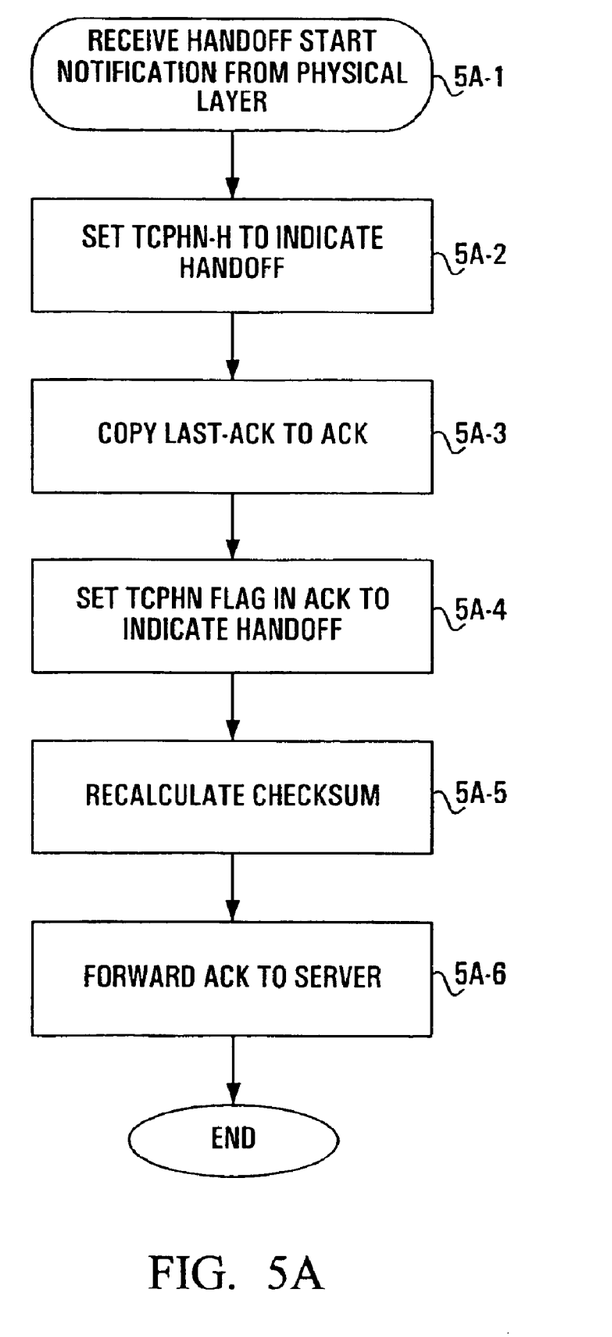
FIGS. 5A, 5B and 5C are flow charts of functions performed by the TCPHN algorithm upon a handoff start, acknowledgement receipt, and handoff end respectively.

Referring firstly to FIG. 5A, this is a flow chart of the functionality of the TCPHN algorithm upon receipt of a handoff start notification from the physical layer in the wireless network 13 that the mobile host 19 is entering handoff (step 5A-1). To begin, the TCPHN algorithm 30 sets TCPHN-H to indicate handoff at step 5A-2. Next, steps are performed to immediately inform the sender that the handoff has occurred. This consists of copying the LAST-ACK variable (maintained as described below with reference to FIG. 5B) into an acknowledgement packet for transmission (step 5A-3). The TCPHN flag in this acknowledgement packet is set to indicate handoff (step 5A-4). Having set this flag, the contents of the acknowledgement packet will have changed and as such it is necessary to recalculate the check sum (step 5A-5). After this, the acknowledgement packet is forwarded to the server 21 (step 5A-6). Optionally, a condition can be set by the TCPHN algorithm 30 such that the wireless network buffers packets received from the server 21 so that they can be forwarded to the mobile host 19 after the handoff. Alternatively, the TCPHN algorithm 30 can simply discard these packets.

Figure 5B:
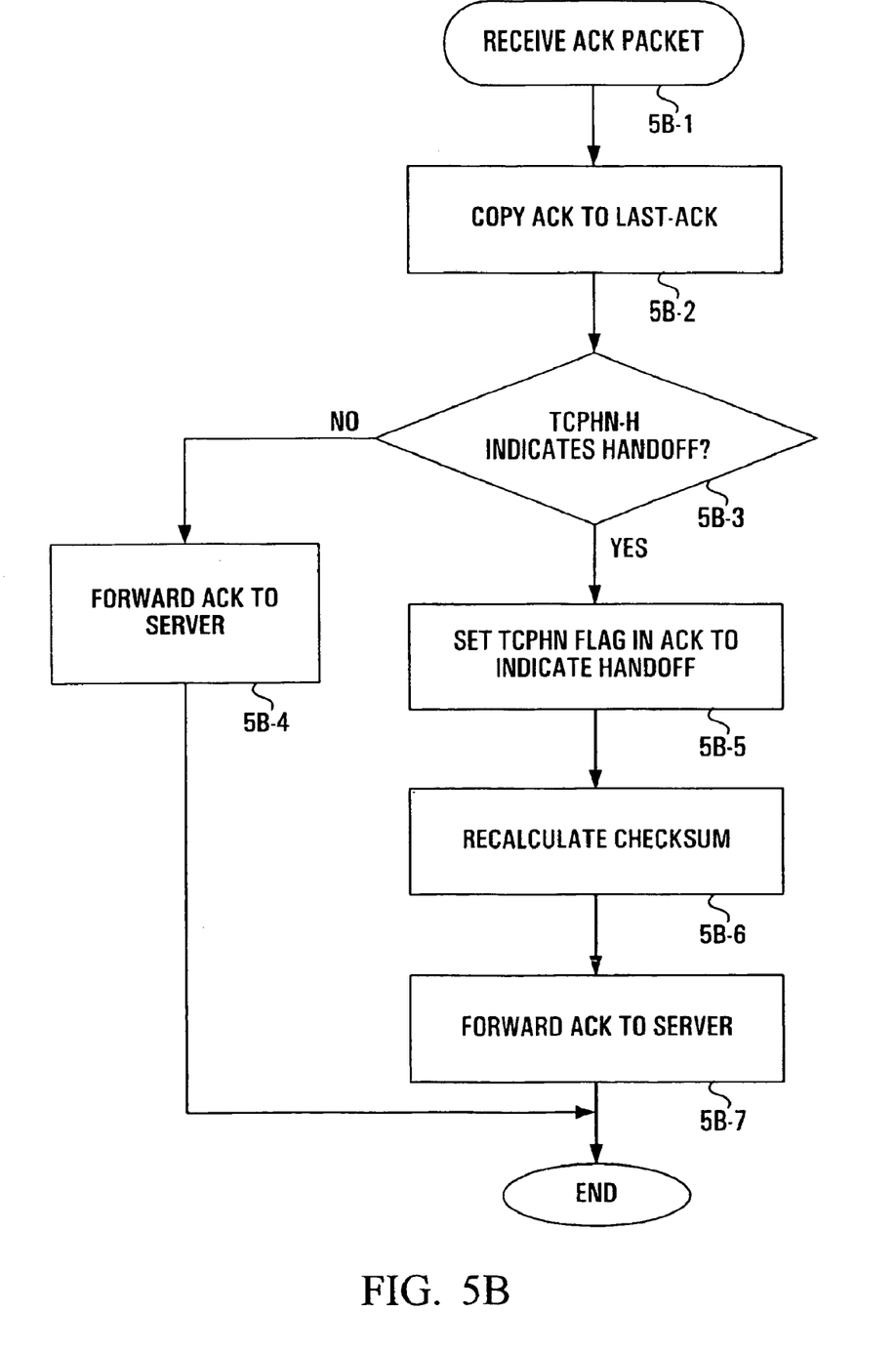
Figure 5C:
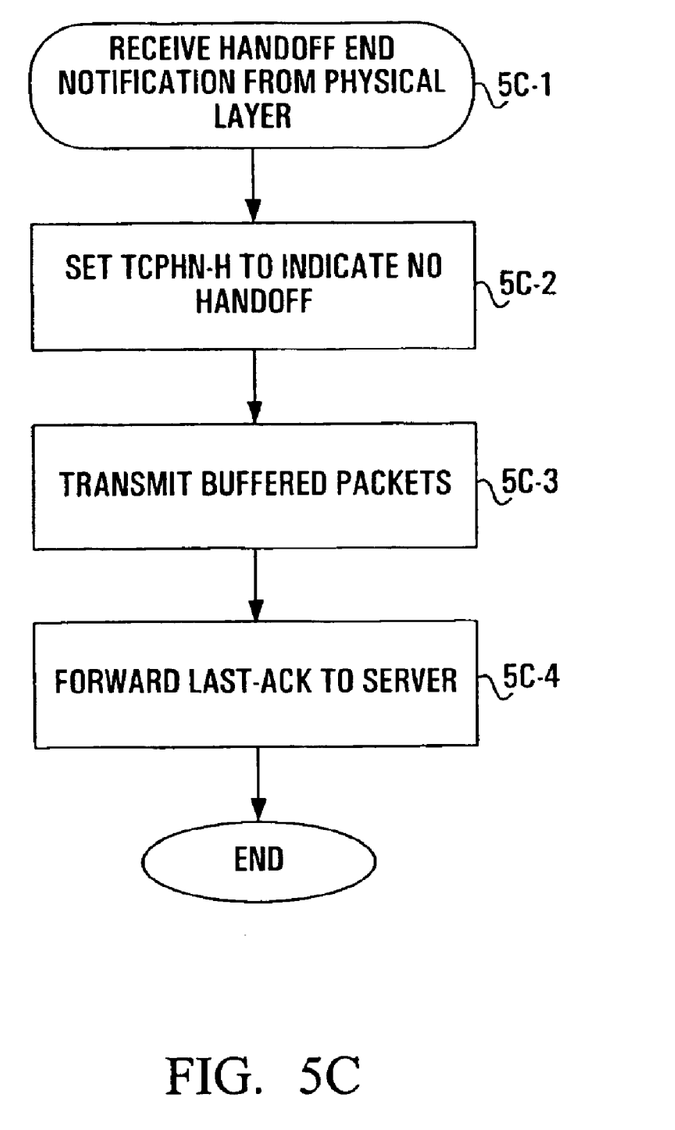

The steps executed by the TCPHN algorithm 30 upon receipt of an acknowledgement packet are described now with reference to FIG. 5B. The first step is to receive an acknowledgement packet (step 5B-1). The algorithm then copies the acknowledgement packet to the LAST-ACK variable (step 5B-2). This is done regardless of whether there is a handoff or not. Next the algorithm checks the TCPHN-H variable to ascertain whether it has been set to indicate a handoff (step 5B-3). In the event that there is no indication of handoff, the acknowledgement packet is simply forwarded on to the server in a conventional fashion (step 5B-4). On the other hand, if the TCPHN-H variable has been set to indicate handoff, the acknowledgement packet is modified by setting the TCPHN flag to indicate handoff (step 5B-5). At this point, since the acknowledgement packet has been changed it is necessary to recalculate the check sum (step 5B-6). After this is completed, the acknowledgement packet is forwarded on to the server 21 (step 5B-7).

The functionality of the TCPHN algorithm upon termination of the handoff will now be described with reference to FIG. 5C. The first step is to receive a handoff end notification from the physical layer of the wireless network (step 5C-1). The algorithm then sets the TCPHN-H variable to indicate no handoff (step 5C-2). At this point, assuming the buffering of packets from the server has been performed, these packets can now be transmitted (step 5C-3). Next, the acknowledgement packet stored in the LAST-ACK variable is sent to the server (step 5C-4). The TCPHN flag in this packet needs to be set to zero if this is not already the case.

It is assumed when the handoff end notification is received that all necessary handoff operations that must be performed at the physical layer have been completed. For the purpose of the present invention, it is also assumed that after the handoff stage, the mobile host 19 is likely attached to a different radio node. In this event it is necessary that all state information from the previous radio node be transferred to the new radio node. This may include the buffered packets in the event that option has been implemented.

The functionality of the TCP protocol stack 24 in the transmitting host will now be described with reference to FIG. 6A which deals with the processing of acknowledgement packets, and FIG. 6B which deals with the processing of timeout interrupts.

Figure 6A:
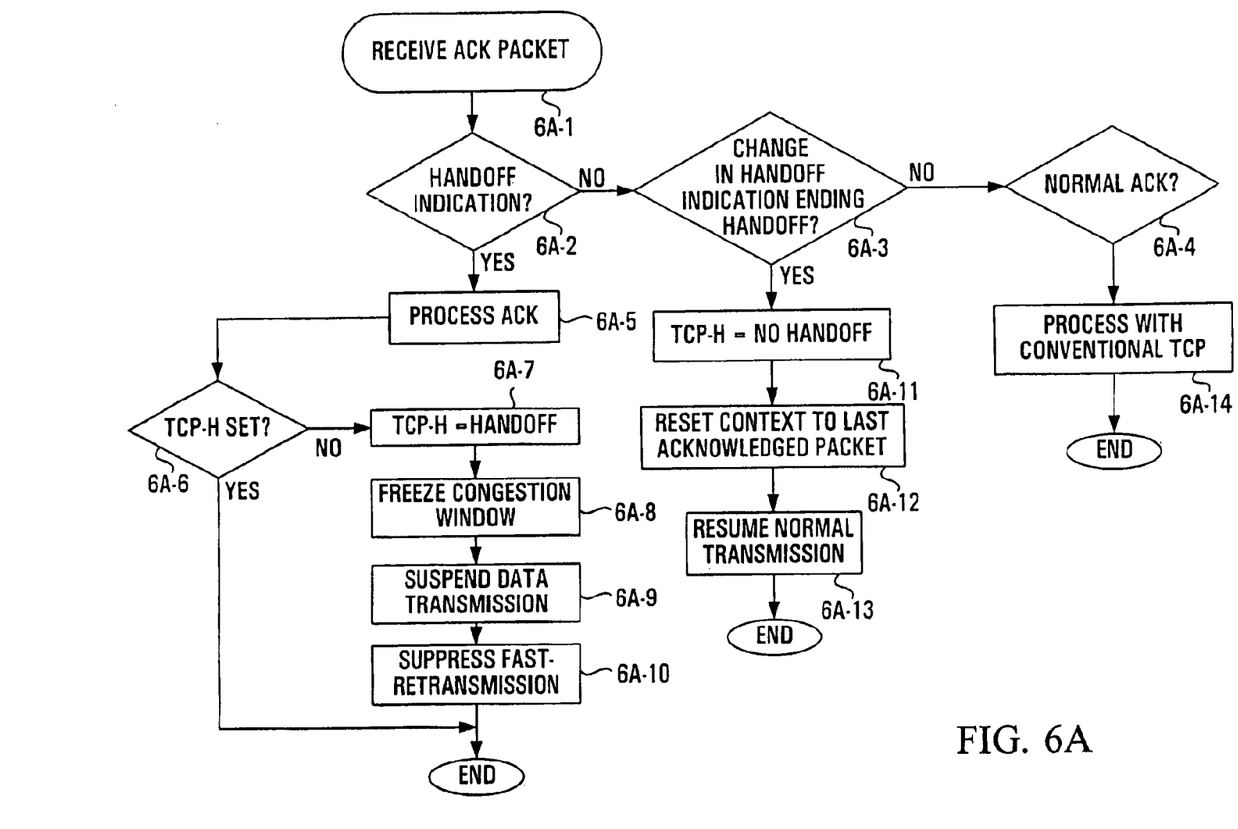
FIGS. 6A and 6B are flow charts of the functions performed by the TCP protocol stack during acknowledgement receipt and timeout respectively.
Figure 6B:
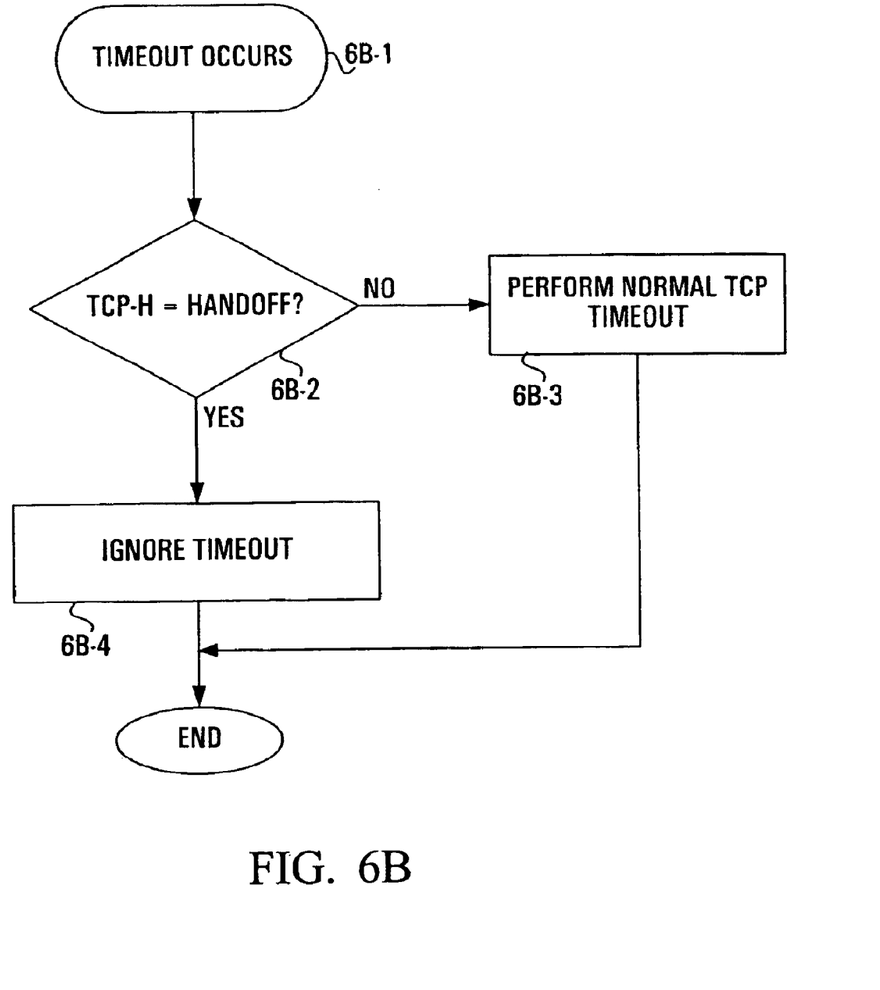

Referring now to FIG. 6A, the first thing which occurs of course is the receipt of an acknowledgement packet (step 6A-1). The packet is examined to determine whether the handoff indication (the TCPHN flag) indicates handoff (step 6A-2). In the event it does indicate handoff, the acknowledgement is processed (step 6A-5). Next, if the TCP-H variable has already previously been set (Yes path, step 6A-6), then nothing further needs to be done since the protocol stack has already been informed that a handoff is in progress. On the other hand, if the TCP-H variable has not previously been set (No path, step 6A-6) then the local TCP-H variable is set to indicate handoff (step 6A-7). Furthermore, the congestion window is frozen (step 6A-8), data transmission is suspended (step 6A-9), and the fast re-transmit feature is suppressed (step 6A-10). This completes the necessary processing of acknowledgements indicating handoff. In the event that there is no handoff indication in the packet (No path, step 6A-2) in step 6A-3 a test is made to determine whether this is a change in the handoff indication. This can be done by checking the TCP-H variable. In the event this indicates handoff, the Yes Path of step 6A-3 is persued. The first step is to change the TCP-H variable to indicate that there is no longer a handoff in progress (step 6A-11). Next, the TCP context is reset to the last acknowledged packet as specified in the acknowledgement packet received (step 6A-12). Finally, normal TCP transmission is resumed at step 6A-13. In the event there was no change in the handoff indication (No path, step 6A-3), the acknowledgement should be a normal acknowledgement and as such it is processed with conventional TCP (step 6A-14).

Typically, a timer will be used by the server 21 and operated such that if any byte of information transmitted to the mobile host 19 is not acknowledged within a predetermined timeout period, the timer will generate a timeout interrupt (or some other timeout indication). The processing of timeout interrupts by the TCP protocol stack 24 will now be described with reference to FIG. 6B. The first step is the occurrence of a timeout interrupt (step 6B-1). In the event the TCP-H variable has been set to indicate handoff, (Yes path, step 6B-2), the TCP protocol stack is instructed to ignore the timeout (step 6B-4). On the other hand, if the TCP-H variable has not been set to indicate handoff (No path, step 6B-2) then a normal TCP timeout is performed (step 6B-3). This typically includes reducing the slow start threshold by half, re-initiating slow start, and re-transmitting unacknowledged data from the last byte acknowledged by the mobile host 19. This completes the functionality in the server required to modify TCP processing such that timeouts do not occur unnecessarily during handoffs.

While the invention has been described above with reference to a particular TCP connection, further modifications and improvements to implement the invention in different TCP connections which will occur to those skilled in the art, may be made within the purview of the appended claims, without departing from the scope of the invention in its broader aspect.

In particular, the TCPHN mechanism of the invention is not restricted to a TCP connection between a server in an IP network and a mobile host in a wireless network. It is to be understood that the TCPHN mechanism can be used in relation to any TCP connection between any transmitting and receiving host in any network where at least one of the transmitting and receiving hosts is mobile.

Further, it is also to be understood that while the TCPHN mechanism has only been described in relation to TCP transmissions from a server to a mobile host, it is not restricted to such particular direction of transmission. According to the invention, the TCPHN mechanism can be applied not only in the server to mobile direction but also in the mobile to server direction.

I claim:

1. A method implemented by a wireless network for a TCP (transmission control protocol) connection between a transmitting host and a wireless receiving host served by the wireless network, the method comprising:
   the wireless network determining when the wireless receiving host is in handoff;
   the wireless network determining when the wireless receiving host is no longer in handoff;
   the wireless network notifying the transmitting host when the wireless receiving host is in handoff and when the wireless receiving host is no longer in handoff.

2. A method according to claim 1 wherein a physical layer protocol determines when the wireless receiving host is in handoff and when the wireless receiving host is no longer in handoff.

3. A method according to claim 1 further comprising:
   the wireless network receiving packets over the TCP connection from the transmitting host;
   while the wireless receiving host is in handoff, the wireless network buffering the packets received over the TCP connection;
   after the wireless receiving host is no longer in handoff, the wireless network transmitting the buffered packets to the wireless receiving host.

4. A method according to claim 1 wherein the wireless network notifying the transmitting host when the wireless receiving host is in handoff and when the wireless receiving host is no longer in handoff is done using acknowledgement packets.

5. A method according to claim 4 wherein the wireless network notifying the transmitting host when the wireless receiving host is in handoff and when the wireless receiving host is no longer in handoff using acknowledgement packets comprises:
   the wireless network receiving acknowledgement packets from the wireless receiving host in respect of the TCP connection;
   the wireless network including an indication in at least one acknowledgement packet of whether the wireless receiving host is in handoff or no longer in handoff;
   the wireless network transmitting the acknowledgements packets to the transmitting host.

6. A method according to claim 4 wherein the wireless network notifying the transmitting host when the wireless receiving host is in handoff and when the wireless receiving host is no longer in handoff using acknowledgement packets comprises:

the wireless network receiving acknowledgement packets from the wireless receiving host in respect of the TCP connection;

the wireless network maintaining a local copy of a last received acknowledgement packet;

the wireless network including an indication in at least one acknowledgement packet of whether the wireless receiving host in handoff;

the wireless network transmitting the acknowledgements packets to the transmitting host;

immediately after determining that the wireless receiving host is no longer in handoff, transmitting the local copy of the last received acknowledgement packet, the local copy indicating the wireless receiving host is no longer in handoff.

7. A method according to claim 4 wherein the wireless network notifying the transmitting host when the wireless receiving host is in handoff and when the wireless receiving host is no longer in handoff using acknowledgement packets comprises:

the wireless network receiving acknowledgement packets from the wireless receiving host in respect of the TCP connection;

the wireless network maintaining a local copy of a last received acknowledgement packet;

immediately after determining that the wireless receiving host is in handoff, transmitting the local copy of the last received acknowledgement packet, the local copy indicating the wireless receiving host is in handoff;

the wireless network transmitting the acknowledgements packets to the transmitting host;

immediately after determining that the wireless receiving host is no longer in handoff, transmitting the local copy of the last received acknowledgement packet, the local copy indicating the wireless receiving host is no longer in handoff.

8. A method according to claim 5 wherein each acknowledgement packet includes an indication of whether the wireless receiving host is in handoff or no longer in handoff.

9. A method according to claim 5 wherein notifying the transmitting host when the wireless receiving host is in handoff and when the wireless receiving host is no longer in handoff using acknowledgement packets is done using a TCP flag in the acknowledgement packets.

10. A method according to claim 5 wherein notifying the transmitting host when the wireless receiving host is in handoff and when the wireless receiving host is no longer in handoff using acknowledgement packets is done using a TCP option in the acknowledgement packets.

11. A method according to claim 1 wherein the wireless network notifying the transmitting host when the wireless receiving host is in handoff and when the wireless receiving host is no longer in handoff is done using ICMP (Internet control message control) messages.

12. A wireless network adapted to implement a method according to claim 1.

13. A transmitting host adapted to implement method according to claim 12.

14. A TCP protocol stack adapted to implement a method according to claim 12.

15. A wireless network node adapted to implement a method according to claim 1.

16. A method implemented by a transmitting host for a TCP connection between the transmitting host and a wireless receiving host served by a wireless network, the method comprising:

the transmitting host receiving notifications of when the wireless receiving host is in handoff and when the wireless receiving host is no longer in handoff;

the transmitting host behaving in a first manner while the wireless receiving host is not in handoff;

the transmitting host behaving in a second manner while the wireless receiving host is in handoff.

17. A method according to claim 16 wherein the transmitting TCP host behaving in a first manner while the wireless receiving host is not in handoff comprises behaving in accordance with conventional TCP.

18. A method according to claim 16 wherein the transmitting TCP host behaving in a second manner while the wireless receiving host is in handoff comprises:

suspending transmission of packets on the TCP connection;

ignoring timeouts due to packets which have been transmitted for which no acknowledgements have been received.

19. A method according to claim 18 wherein the transmitting TCP host behaving in a second manner while the wireless receiving host is in handoff further comprises suppressing fast retransmit.

20. A method according to claim 16 wherein the transmitting TCP host behaving in a second manner while the wireless receiving host is in handoff comprises:

suspending transmission of packets on the TCP connection;

ignoring timeouts due to packets which have been transmitted for which no acknowledgements have been received;

freezing a TCP congestion window.

21. A method according to claim 20 further comprising upon first receiving an indication that the wireless receiving host is not in handoff after previously having received an indication that the wireless receiving host is in handoff the transmitting host resuming behaving in the first manner from a previous transmission context beginning with a packet following a last acknowledged packet.

22. A method according to claim 16 further comprising upon first receiving an indication that the wireless receiving host is not in handoff after previously having received an indication that the wireless receiving host is in handoff the transmitting host resuming behaving in the first manner from a previous transmission context beginning with a packet following a last acknowledged packet.

23. An apparatus adapted to be an intermediary in a TCP connection between a transmitting host and a wireless receiving host, the apparatus comprising:

means for determining when the wireless receiving host is in handoff;

means for determining when the wireless receiving host is no longer in handoff;

means for notifying the transmitting host when the wireless receiving host is in handoff and when the wireless receiving host is no longer in handoff.

* * * * *